(12) United States Patent
Suemitsu et al.

(10) Patent No.: US 10,054,278 B2
(45) Date of Patent: Aug. 21, 2018

(54) VEHICLE HEADLAMP

(71) Applicant: KOITO MANUFACTURING CO., LTD., Tokyo (JP)

(72) Inventors: Hiroyuki Suemitsu, Shizuoka (JP); Yusuke Aoki, Shizuoka (JP); Koji Okawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 15/806,914

(22) Filed: Nov. 8, 2017

(65) Prior Publication Data
US 2018/0128444 A1    May 10, 2018

(30) Foreign Application Priority Data

Nov. 8, 2016   (JP) .................................. 2016-218007

(51) Int. Cl.
| | |
|---|---|
| *F21V 1/00* | (2006.01) |
| *F21S 45/47* | (2018.01) |
| *F21S 8/10* | (2006.01) |
| *F21V 29/74* | (2015.01) |
| *F21V 29/89* | (2015.01) |
| *F21V 17/10* | (2006.01) |
| *F21S 41/36* | (2018.01) |
| *F21S 41/141* | (2018.01) |
| *F21Y 115/10* | (2016.01) |

(52) U.S. Cl.
CPC ............. *F21S 45/47* (2018.01); *F21S 41/141* (2018.01); *F21S 41/36* (2018.01); *F21S 48/115* (2013.01); *F21S 48/1388* (2013.01); *F21S 48/328* (2013.01); *F21V 17/101* (2013.01); *F21V 29/74* (2015.01); *F21V 29/89* (2015.01); *F21Y 2115/10* (2016.08)

(58) Field of Classification Search
CPC .......... F21S 45/47; F21S 41/141; F21V 29/74
See application file for complete search history.

(56) References Cited

U.S. PATENT DOCUMENTS

| | | | |
|---|---|---|---|
| 8,523,416 B2* | 9/2013 | Ohmi ..................... | B60Q 1/076 362/538 |
| 2010/0253223 A1* | 10/2010 | Inoue ...................... | F21V 29/02 315/82 |
| 2011/0286231 A1* | 11/2011 | Sugie .................... | F21V 19/001 362/549 |

FOREIGN PATENT DOCUMENTS

JP     2015-046235 A    3/2015

\* cited by examiner

*Primary Examiner* — Evan Dzierzynski
(74) *Attorney, Agent, or Firm* — Osha Liang LLP (57) ABSTRACT

A vehicle headlamp includes a reflector unit including plural reflectors connected to each other, and base portions to which the reflectors are connected respectively, plural light-source units disposed on the base portions for the respective reflectors, plural heat radiation members disposed on the respective light-source units. The base portions are provided with plural heat radiation member fixing ribs extending to a side opposite to the reflectors. The heat radiation members are formed with plural heat radiation member fixing holes having a diameter larger than that of the heat radiation member fixing ribs. Each of the heat radiation member fixing ribs is inserted through the respective one of the heat radiation member fixing holes and thermally crimped such that a gap is formed between an inner peripheral surface of the heat radiation member fixing hole and an outer peripheral surface of the heat radiation member fixing rib.

5 Claims, 6 Drawing Sheets

VEHICLE HEADLAMP

CROSS-REFERENCE TO RELATED APPLICATIONS

The present application claims the benefit of priority of Japanese Patent Application No. 2016-218007, filed on Nov. 8, 2016, the content of which is incorporated herein by reference.

TECHNICAL FIELD

Aspects of the present invention relate to a vehicle headlamp, specifically to a vehicle headlamp with excellent thermal durability.

BACKGROUND

A vehicle headlamp, for example, an automobile headlight, includes a plurality of lamps arranged therein. JP-A-2015-46235 discloses such a vehicle headlamp.

This vehicle headlamp includes a reflector unit, a substrate on which a Light Emitting Diode (LED) is mounted, and a heat radiation plate. The reflector unit includes a plurality of reflectors with reflective surfaces formed on base members. In each reflector, the base member is integrated by resin molding, and reflective surfaces are formed by aluminum vapor deposition on the respective base members. The substrate is supported by an upper surface of the reflector unit across respective reflectors, and a plurality of LEDs corresponding to the respective reflectors are mounted on the substrate. The upper surface of the reflector unit is formed with holes for guiding light from the LEDs to the reflective surfaces of the reflectors. Further, on a side of the substrate opposite to the surface on which the LEDs are mounted, a metallic heat radiation plate is supported through an insulation sheet across the mounting positions of the LEDs. The heat generated from each LED mounted on the substrate is radiated though the heat radiation plate.

If a relative position between the substrate, on which the LEDs are mounted, and the reflectors is not aligned, it is difficult to obtain the desired light distribution, and if the substrate and the heat radiation plate are separated from each other, there is concern for problems due to heat from the LEDs Therefore, although not explicitly described in JP-A-2015-46235, in general, the reflector unit, the substrate, and the heat radiation plate are fixed to each other by screws. Further, in a typical vehicle headlamp, similar to the vehicle headlamp of JP-A-2015-46235, the reflector unit includes a base member made of resin, and the heat radiation plate is made of metal. Incidentally, in general, the resin and the metal have different thermal expansion coefficients, and the metal has higher rigidity than that of the resin.

In the vehicle headlamp of JP-A-2015-46235, the heat radiation plate is disposed on the reflector unit, in which the reflectors are integrated with each other, via the substrate and the insulating sheet. As described above, the heat radiation plate is disposed across the mounting positions of the respective LEDs, so that the heat radiation plate is disposed across the respective reflectors.

In the meantime, in a vehicle headlamp, the temperature of ambient atmosphere in the vehicle headlamp may increase due to heat generated by a lighting circuit or heat transferred from an engine in addition to heat generated by light-emitting elements such as LEDs. If the thermal conductivity of the reflector unit differs from that of the heat radiation plate and the heat radiation plate has higher rigidity than the reflector unit, when the temperature of the vehicle headlamp rises, stress could be generated on the reflector unit due to the difference in thermal expansion coefficients between the reflector unit and the heat radiation plate.

SUMMARY

Accordingly, it is an aspect of the present invention to provide a vehicle headlamp with excellent heat durability.

According to an embodiment of the present invention, there is provided, a vehicle headlamp including: a reflector unit including a plurality of reflectors connected to each other, and base portions to which the reflectors are connected respectively; a plurality of light-source units disposed on the base portions for the respective reflectors; a plurality of heat radiation members disposed on the respective light-source units, wherein the base portions are provided with a plurality of heat radiation member fixing ribs extending to a side opposite to the reflectors, wherein the heat radiation members are formed with a plurality of heat radiation member fixing holes having a diameter larger than that of the heat radiation member fixing ribs, and wherein each of the heat radiation member fixing ribs is inserted through the respective one of the heat radiation member fixing holes and thermally crimped such that a gap is formed between an inner peripheral surface of the heat radiation member fixing hole and an outer peripheral surface of the heat radiation member fixing rib.

When light is emitted from the light-source unit, the light-source unit tends to generate heat. The heat is transferred to a heat radiation member disposed on the light-source unit and is radiated from the heat radiation member. Incidentally, the reflector unit and the heat radiation member are generally made of different materials, as described above. For example, as in JP-A-2015-46235, the reflector unit is made of resin, and the heat radiation member is made of metal. Thus, the reflector unit and the heat radiation member made of different materials tend to have different thermal expansion coefficients from each other. Therefore, when the temperature of the reflector unit and the heat radiation member increase due to heat generated by the light-source unit, the reflector unit and the heat radiation member expand with different expansion rates. Even when the reflector unit and the heat radiation member have the same thermal expansion coefficient, the reflector unit and the heat radiation member may expand at different expansion rates due to a temperature difference between the reflector unit and the heat radiation member. According to the vehicle headlamp having the above configuration, the plurality of heat radiation members are individually disposed at each of the light-source units disposed at each reflector. Therefore, even when the reflector unit thermally expands, and the distance between the reflectors increases, change in the relative position between the reflectors and the heat radiation members disposed for the reflectors can be suppressed. Further, a heat radiation member fixing rib extending from the base portion is inserted through the heat radiation member fixing hole of the heat radiation member and thermally crimped thereto, so as to fix the heat radiation member. The diameter of the heat radiation member fixing rib is smaller than the diameter of the heat radiation fixing hole. Even in the thermally crimped state, a gap is formed between the inner peripheral surface of the heat radiation member fixing hole and the outer peripheral surface of the heat radiation member fixing rib. Therefore, in a state of being thermally crimped, while movement of the heat radiation members in the extending direction of the heat radiation member fixing ribs is restricted, there is room for movement in a direction perpendicular to the extending direction. Therefore, even when the reflector unit and the heat radiation members expand with different thermal expansion coefficients, since the heat radiation member fixing ribs which fix the heat radiation members are movable in the heat radiation member fixing holes, stress on each of the reflectors can be suppressed.

Further, the temperature of the reflector unit increases due to heat generated by the light-source unit and the distance between the reflectors tends to increase. According to the vehicle headlamp having the above configuration, since the light-source unit is disposed to each of the reflectors, change in the relative positions between the reflector and the light-source unit disposed thereon can be suppressed even when the distance between the reflectors increases.

Accordingly, the vehicle headlamp having the above configuration has excellent heat durability.

In the above, the thermal conductivity of the heat radiation member may be larger than the thermal conductivity of the reflector unit.

Thermal crimping refers to a state where the heat radiation member fixing rib protruding from the heat radiation member fixing hole is deformed by applying heat to have the diameter larger than that of the heat radiation member fixing hole. Therefore, since the thermal conductivity of the heat radiation member is larger than the thermal conductivity of the reflector unit, the heat for deforming the heat radiation member fixing rib at the time of thermal crimping is mainly transferred to the heat radiation member. Accordingly, deformation of the reflector unit can be suppressed when the heat radiation member is fixed to the reflector unit.

In the above, the base portions may be provided with a plurality of light-source unit fixing ribs extending to the side opposite to the reflector, the light-source units may be formed with a plurality of light-source unit fixing holes having a diameter larger than a diameter of the light-source unit fixing ribs, and each of the light-source unit fixing ribs may be inserted through the respective one of the light-source unit fixing holes and thermally crimped such that a gap is formed between an inner peripheral surface of the light-source unit fixing hole and an outer peripheral surface of the light-source unit fixing rib.

The reflector unit and the light-source unit are generally made of different materials. For example, in a case where the light-source unit includes a light-emitting element and a substrate on which the light-emitting element is mounted, and the substrate is made of metal, ceramic, or the like, the light-source unit tends to have a thermal expansion coefficient different from that of the reflector unit. In this case, when the temperatures of the reflector unit and the light-source unit rise, the reflector unit and the light-source unit tend to expand with different expansion rates, and even when the reflector unit and the light-source unit have the same thermal expansion coefficient, they may expand at different expansion rates due to a temperature difference between the reflector unit and the light-source unit. According to the vehicle headlamp having the above configuration, the light-source unit fixing rib is inserted into the light-source unit fixing hole which has a diameter larger than that of the light-source unit fixing rib and then thermally crimped such that a gap is formed between the inner peripheral surface of the light-source unit fixing hole and the outer peripheral surface of the light-source unit fixing rib, so that the light-source units are fixed to the reflector unit. Therefore, in a state of being thermally crimped, while movement of the light-source units in the extending direction of the light-source unit fixing ribs is restricted, there is room for movement in a direction perpendicular to the extending direction. Therefore, even when the reflector unit and the light-source units expand with different thermal expansion coefficients, since the light-source unit fixing ribs are movable within the light-source unit fixing hole, stress on the reflectors can be suppressed. Therefore, the vehicle headlamp having this configuration is more superior in heat durability.

The light-source units may be formed with a plurality of light-source unit fixing holes having a diameter larger than that of the heat radiation member fixing ribs at positions which overlap with the heat radiation member fixing holes, and the heat radiation member fixing ribs may be inserted through the light-source unit fixing holes.

Accordingly, by fixing the light-source unit with the heat radiation member fixing rib, it is possible to reduce the number of ribs and to have a simple configuration.

Further, each of the light-source units may include a light-emitting element and a substrate on which the light-emitting element is mounted, and the light-source unit fixing holes may be formed in the substrate.

As described above, according to the above configuration, it is possible to provide a vehicle headlamp with excellent heat durability.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, a vehicle headlamp according to embodiments of the present invention will be described with accompanying drawings. The embodiments described below are for facilitating understanding of the present invention and are not intended to limit the present invention. The present invention can be modified and improved from the following embodiments without departing from the objective thereof.

First Embodiment

Figure 1:
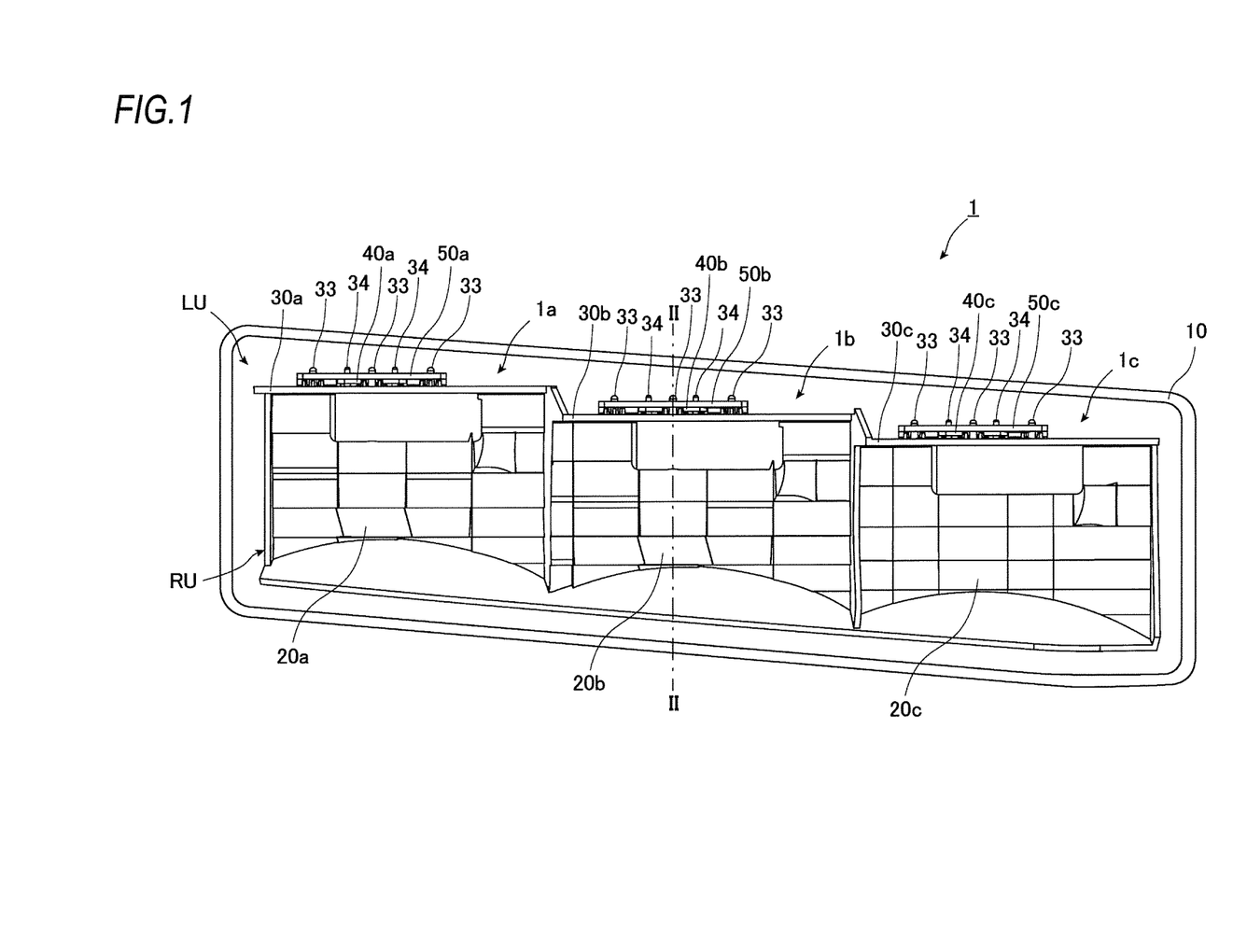
FIG. 1 is a front view of a vehicle headlamp according to a first embodiment of the present invention.

FIG. 1 is a front view of a vehicle headlamp according to a first embodiment. The vehicle headlamp 1 according to the present embodiment is provided to left and right of a front of a vehicle. The left and right vehicle headlamps are configured to be approximately symmetrical in the left-right direction. Therefore, in the present embodiment, one of the vehicle headlamps will be described.

Figure 2:
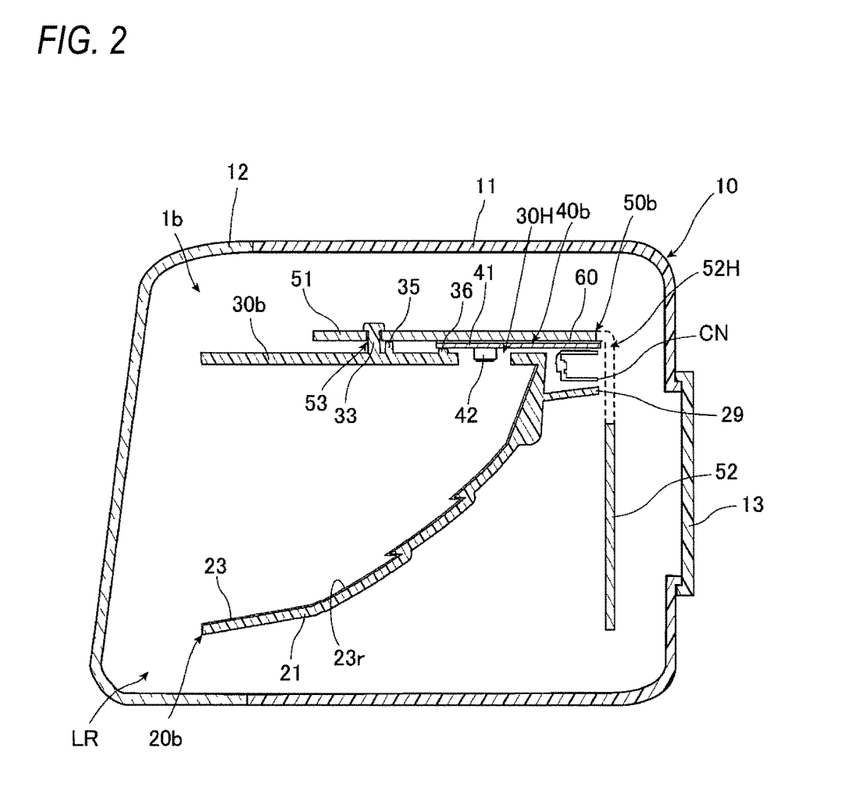
FIG. 2 is a cross-sectional view taken along line II-II of FIG. 1.

FIG. 2 is a cross-sectional view taken along line II-II of FIG. 1. As shown in FIGS. 1 and 2, the vehicle headlamp 1 includes a housing 10 and a lamp unit LU housed in the housing 10. Although not shown in FIGS. 1 and 2, the vehicle headlamp 1 includes blinding members for hiding unnecessary portions of the lamp unit LU when the vehicle headlamp 1 is viewed from the front.

The housing 10 mainly includes a lamp housing 11, a light-transmissive front cover 12, and a back cover 13. The front of the lamp housing 11 has an opening, and the light-transmissive front cover 12 is fixed to the lamp housing 11 so as to close the opening. Further, the back of the lamp housing 11 has an opening smaller than the front opening, and the back cover 13 is fixed to the lamp housing 11 so as to cover the back opening.

The space formed by the lamp housing 11, the front cover 12 which covers the front opening of the lamp housing 11, and the back cover 13 which covers the back opening of the lamp housing 11 is referred to as a lamp room LR, and the lamp unit LU is housed in the lamp room LR.

Figure 3:
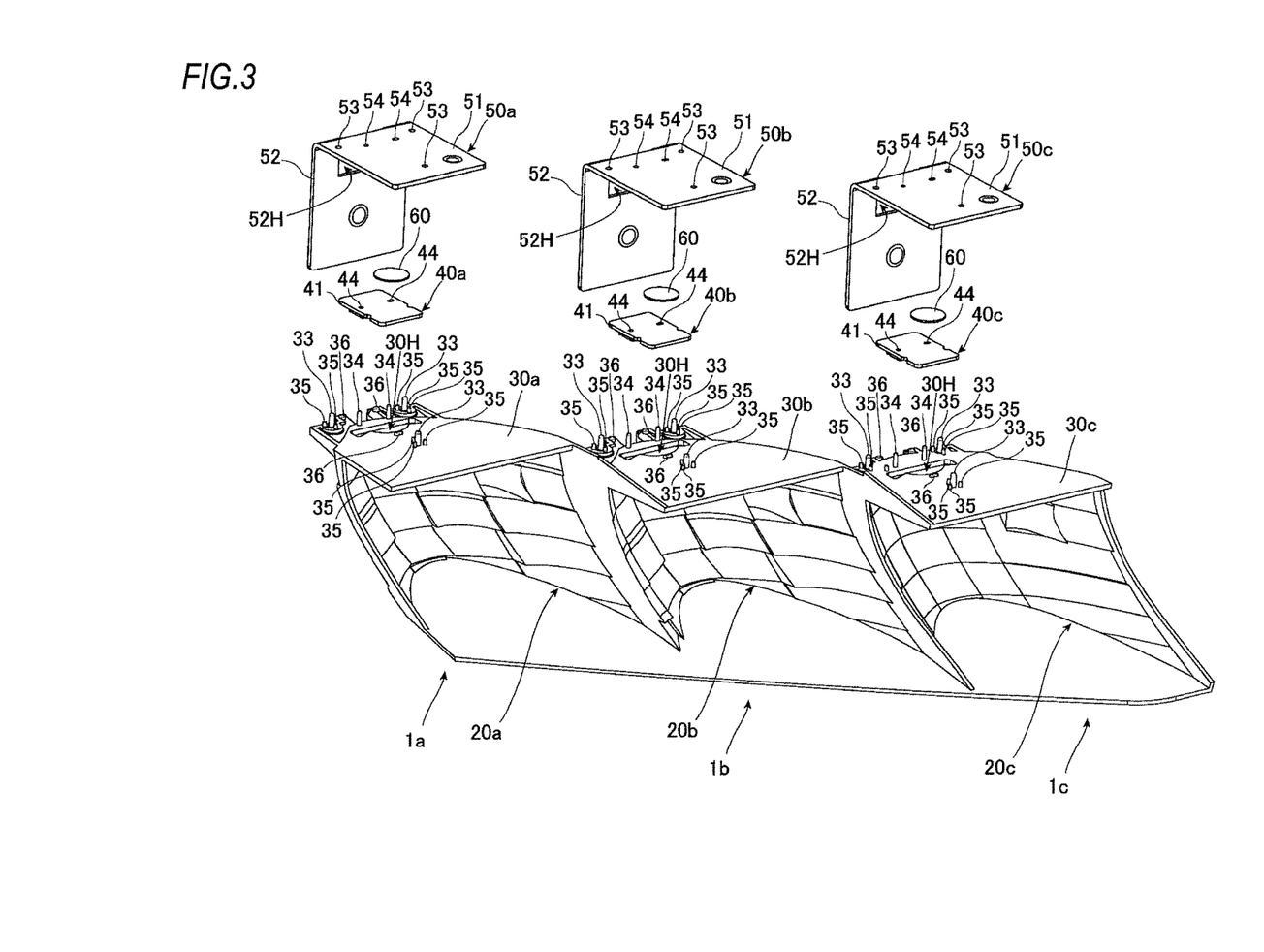
FIG. 3 is an exploded perspective view of a lamp unit of FIG. 1.

FIG. 3 is an exploded perspective view of the lamp unit LU shown in FIG. 1. As shown in FIGS. 1 and 3, the lamp unit LU includes a plurality of lamps 1a, 1b, 1c arranged side by side. The lamp 1a mainly includes a reflector 20a, a base portion 30a connected to the reflector 20a, a light-source unit 40a disposed on the base portion 30a, and a heat radiation member 50a disposed on the light-source unit 40a. The lamp 1b mainly includes a reflector 20b, a base portion 30b connected to the reflector 20b, a light-source unit 40b disposed on the base portion 30b, and a heat radiation member 50b disposed on the light-source unit 40b. The lamp 1c mainly includes a reflector 20c, a base portion 30c connected to the reflector 20c, a light-source unit 40c disposed on the base portion 30c, and a heat radiation member 50c disposed on the light-source unit 40c.

The reflector 20a and the reflector 20b are connected to each other, and the reflector 20b and the reflector 20c are connected to each other. Further, the base portion 30a and the base portion 30b are connected to each other with a predetermined height difference therebetween, and the base portion 30b and the base portion 30c are connected to each other with a predetermined height difference therebetween. In this manner, the reflector 20a, the reflector 20b, and the reflector 20c are connected to each other, thereby forming a reflector unit RU having a plurality of reflectors and base portions to which the respective reflectors are connected.

In the present embodiment, each of the lamps 1a, 1b, 1c has approximately the same configuration. Accordingly, the reflector 20a, the reflector 20b, and the reflector 20c have approximately the same configuration; the base portion 30a, the base portion 30b, and the base portion 30c have approximately the same configuration; the light-source unit 40a, the light-source unit 40b, and the light-source unit 40c have approximately the same configuration; and the heat radiation member 50a, the heat radiation member 50b, and the heat radiation member 50c have approximately the same configuration. Accordingly, the following explanation will be made with the lamp 1b as an example.

The reflector 20b includes a reflector main body 21 and a plated portion 23. The reflector main body 21 is made of resin and is divided into a plurality of reflective steps with a height difference between the reflective steps. The plated portion 23 is formed by metal-plating the front side (front cover 12 side) surface of the reflector main body 21. The surface of the plated portion 23 is made to be a light reflective surface 23r.

The reflective surface 23r is formed in a concave shape having a free curved surface based on a parabola whose opening direction is on the front side. Specifically, the shape of the reflective surface 23r in the vertical cross section is approximately the shape of a parabola lower than the vertex thereof, and the shape of the reflective surface 23r in the horizontal cross section is approximately the shape of a parabola including the vertex thereof. The parabola shape in the vertical cross section of the reflective surface 23r and the parabola shape in the horizontal cross section may be different. Further, the shape of the reflective surface 23r in the horizontal cross section may not be a shape based on a parabola, and may be, for example, a shape based on a part of an ellipse or another concave shape. In the present embodiment, the reflective surface 23r is formed in a concave shape having a free-form surface based on a parabola with steps formed thereon.

A reinforcing member 29 is connected to the back surface of the reflector main body 21, and deformation of the reflector 20b is suppressed by the reinforcing member 29.

The resin forming the reflector main body 21 may be polycarbonate (PC), unsaturated polyester resin (BMC), or the like. The metal forming the plated portion 23 may be nickel, chromium, aluminum, or the like. For example, the linear expansion coefficient of polycarbonate is $70 \times 10^{-6}$ to $80 \times 10^{-6}$ [/K]. Since the layer thickness of the plated portion 23 is small, the linear expansion coefficient of the reflector main body 21 is dominant in the linear expansion coefficient of the entire reflector 20b.

The base portion 30b is a member made of resin with an approximately flat-plate shape and has an opening 30H. The base portion 30b is connected to the reflector main body 21 by integral molding. Further, a plurality of heat radiation member fixing ribs 33 are provided on the upper surface of the base portion 30b on the side opposite to the reflector 20b. In the present embodiment, three heat radiation member fixing ribs 33 are provided. Further, a plurality of light-source unit fixing ribs 34 are provided on the upper surface of the base portion 30b. In the present embodiment, two light-source unit fixing ribs 34 are provided. The heat radiation member fixing rib 33 and the light-source unit fixing rib 34 extend to the side opposite to the reflector 20b.

Further, on the upper surface of the base 30b, a plurality of heat radiation member positioning protruding portions 35 are provided around each of the heat radiation member fixing ribs 33. In the present embodiment, three heat radiation member positioning protruding portions 35 are provided around each of the heat radiation member fixing ribs 33. The heat radiation member positioning protruding portion 35 is a member for arranging the heat radiation member 50b (described later), and the position of the heat radiation member 50b in the height direction is determined by the heat radiation member positioning protruding portion 35.

On the upper surface of the base portion 30b, a plurality of light-source unit positioning protruding portions 36 are provided. In the present embodiment, three light-source unit positioning protruding portions 36 are provided on the base portion 30b. As will be described later, the light-source unit positioning protruding portion 36 is a member for arranging the light-source unit 40b, and the position of the light-source unit 40b in the height direction is determined by the light-source unit positioning protruding portion 36.

The heat radiation member fixing rib 33, the light-source unit fixing rib 34, the heat radiation member positioning protruding portions 35, and the light-source unit positioning protruding portions 36 are made of resin and fixed to the base portion 30b by integral molding.

The back side of the reflector 20b is disposed with a connector CN to which a cable for supplying power to the light-source unit 40b is connected. Although not specifically shown, the connector CN is connected to the reflector unit RU.

The reflector 20a, the reflector 20b, and the reflector 20c are connected to each other by integral molding of each of the reflector main bodies 21, and the base portion 30a, the base portion 30b, and the base portion 30c are also connected to each other by integral molding as described above.

The light-source unit 40b mainly includes a substrate 41 and a light-emitting element 42.

The substrate 41 is a flat circuit board and is made of metal, ceramic, glass epoxy or the like. When the substrate 41 is made of metal, wirings and terminals of electronic components arranged on the substrate 41 are insulated from the substrate 41. A plurality of light-source unit fixing holes 44 are formed in the substrate 41. The positions of these light-source unit fixing holes 44 overlap with the positions of the light-source unit fixing ribs 34 in plan view when the substrate 41 is disposed on the base portion 30b of the reflector unit RU. The diameter of the light-source unit fixing hole 44 is larger than the diameter of the light-source unit fixing rib 34. For example, it is preferable that the diameter of the light-source unit fixing hole 44 be larger than the diameter of the light-source unit fixing rib 34 by 0.03 mm or less. The reason for this is as follows. That is, the light distribution changes when the relative position between the light-source unit 40b and the reflector 20b changes. Therefore, it is preferable that when the reflector 20b expands, the light-source unit 40b follow the reflector 20b as closely as possible. The lamp unit fixing hole 44 determines the position of the lamp unit 40b. On the other hand, it is preferable that a gap be formed between the outer peripheral surface of the light-source unit fixing rib 34 and the inner peripheral surface of the light-source unit fixing hole 44 in view of that the light-source unit fixing rib 34 is movable in a direction perpendicular to an extending direction thereof. Therefore, from the viewpoint of the requirement of light distribution and the slight movement of the light-source unit fixing rib 34, the diameter of the light-source unit fixing hole 44 is preferably larger than the diameter of the light-source unit fixing rib 34 within the above range. It is noted that, the shape of the light-source unit fixing hole 44 is not limited to a circular shape and may be a race-track shape, for example. In this case, it is preferable that the largest and smallest diameters of the race-track shape fall within the above range.

The light-emitting element 42 is disposed on one surface of the substrate 41. The light-emitting element 42 is configured by, for example, LEDs, and the light-emitting surface of the light-emitting element 42 is on the side opposite to the substrate 41.

The light-source unit 40b is disposed on the base portion 30b such that the light-emitting element 42 is exposed from the opening 30H of the base portion 30b. At this time, the light-source unit fixing ribs 34 are inserted through the respective light-source unit fixing holes 44, and the substrate 41 is in contact with the light-source unit positioning protruding portions 36 of the base portion 30b. Accordingly, the position of the light-source unit 40b in the direction along the upper surface of the base portion 30b is determined by the light-source unit fixing rib 34, and the position of the light-source unit 40b in the direction perpendicular to the upper surface of the base portion 30b is determined by the light-source unit positioning protruding portion 36.

The heat radiation member 50b is formed by bending a single sheet of metal approximately vertically and includes a top plate 51 and a back plate 52 which are perpendicular to each other. Examples of the metal which forms the heat radiation member 50b include aluminum, copper, iron or the like. The linear expansion coefficient of aluminum at 25° C. is 23×10⁻⁶ [/K]. In general, since a metal has a thermal conductivity higher than that of resin, the thermal conductivity of the heat radiation member 50b is higher than the thermal conductivity of the reflector unit RU. For example, in the case where the reflector unit RU is mainly made of resin as described above, the thermal conductivity of polycarbonate is 0.18 [W/mK], and the thermal conductivity of aluminum at approximately 27° C. is 237 [W/mK].

The top plate 51 is formed with a plurality of heat radiation member fixing holes 53. When the top plate 51 of the heat radiation member 50b is disposed on the base portion 30b of the reflector unit RU, the positions of the heat radiation member fixing holes 53 overlap with the positions of the heat radiation member fixing ribs 33 in plan view. The diameter of the heat radiation member fixing hole 53 is larger than the diameter of the heat radiation member fixing rib 33. For example, it is preferable that the diameter of the heat radiation member fixing hole 53 be larger than the diameter of the heat radiation member fixing rib 33 by 0.4 to 0.5 mm. With such a size, for example, in a general-size vehicle headlamp, when the reflector main body 21 is made of polycarbonate and the heat radiation member 50b is made of aluminum as described above, the stress applied to the reflector 20b can be sufficiently suppressed (described later). The shape of the heat radiation member fixing hole 53 is not limited to a circular shape and may be a race-track shape, for example. In this case, it is preferable that the largest and smallest diameters of the race-track shape fall within the above range.

The top plate 51 is formed with a plurality of light-source unit fixing rib insertion holes 54. The positions of these light-source unit fixing rib insertion holes 54 overlap with the light-source unit fixing ribs 34 in plan view when the top plate 51 of the heat radiation member 50b is disposed on the base portion 30b of the reflector unit RU. The diameter of the light-source unit fixing rib insertion hole 54 is larger than the diameter of the light-source unit fixing rib 34. For example, it is preferable that the diameter of the light-source unit fixing rib insertion hole 54 be larger than the diameter of the light-source unit fixing rib 34 by 0.2 to 0.4 mm. The shape of the light-source unit fixing rib insertion hole 54 is not limited to a circular shape and may be, for example, a race-track shape similar to the shape of the heat radiation member fixing hole 53. In this case, it is preferable that the largest and smallest diameters of the race-track shape fall within the above range.

The back plate 52 is a member positioned on the back side of the reflector 20b in a state where the top plate 51 is disposed on the base portion 30b of the reflector 20b. The back plate 52 is formed with an approximately rectangular opening 52H which is in contact with the edge of the top plate 51. The opening 52H is configured for connecting a cable (not shown) to the connector CN.

The heat radiation member 50b is disposed on the light-source unit 40b in a state where the light-source unit 40b is disposed on the base portion 30b as described above. At this time, in the present embodiment, a heat transfer layer 60 is disposed between the top plate 51 and the light-source unit 40b. The heat transfer layer 60 is a layer which transfers heat by filling a gap between the top plate 51 and the substrate 41. The heat transfer layer 60 may be heat transfer grease, a heat transfer sheet having flexibility, or the like. Unlike the present embodiment, the heat transfer layer 60 may be omitted and the substrate 41 and the top plate 51 may be in direct contact with each other. In a state where the heat radiation member 50b is disposed on the light-source unit 40b, the heat radiation member fixing ribs 33 are inserted through the heat radiation member fixing holes 53, respectively, and the light-source unit fixing ribs 34 are inserted into the light-source unit fixing rib insertion holes 54 of the top plate 51, respectively. At this time, the top plate 51 abuts on each of the heat radiation member positioning protruding portions 35 of the base portion 30b, and the substrate 41 is sandwiched between the base portion 30b and the top plate 51. As described above, the heat transfer layer 60 is interposed between the substrate 41 and the top plate 51. Accordingly, the position of the heat radiation member 50b along the upper surface of the base portion 30b is determined by the heat radiation member fixing ribs 33, and the position of the heat radiation member 50b in the direction perpendicular to the upper surface of the base portion 30b is determined by the heat radiation member positioning protruding portions 35.

Figure 4:
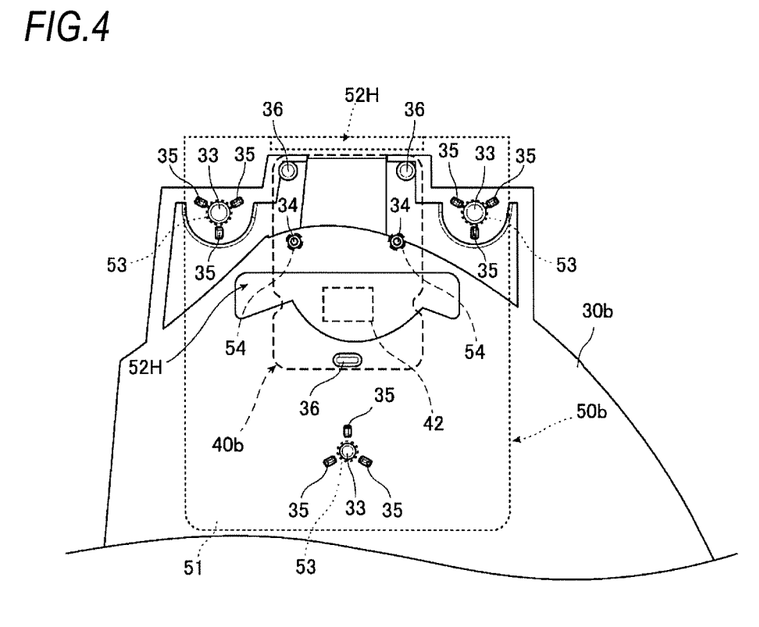
FIG. 4 is a plan view of a base portion on which a light-source unit and a heat radiation member are arranged.

FIG. 4 is a plan view of the base portion 30b in a state where the light-source unit 40b and the heat radiation member 50b are disposed on the base portion 30b. In FIG. 4, for ease of understanding, the light-source unit 40b is indicated by a dashed line, and the heat radiation member 50b is indicated by a dotted line. As shown in FIG. 4, the light-source unit 40b is covered with the top plate 51 of the heat radiation member 50b. Further, in the present embodiment, the heat radiation member fixing ribs 33 on the right and left sandwich the light-source unit 40b. In other words, the distance between adjacent heat radiation member fixing ribs 33 are set such that the heat radiation member fixing ribs 33 are disposed at the outer side of the light-source unit 40b.

Figure 5:
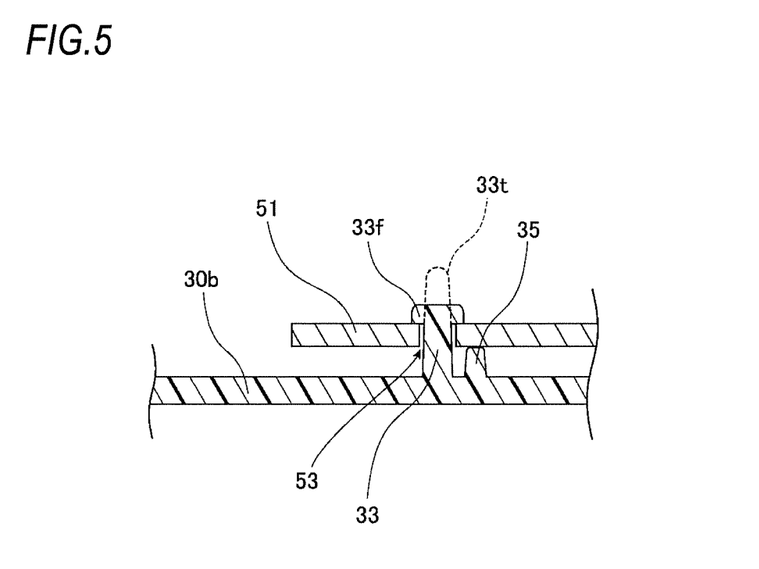
FIG. 5 is a cross-sectional view showing a state of thermal crimping of a heat radiation member fixing rib.

In a state where the light-source unit 40b and the heat radiation member 50b are disposed on the base portion 30b as described above, the light-source unit 40b and the heat radiation member 50b are fixed by thermal crimping. FIGS. 1, 3 and 4 show a state where the light-source unit 40b and the heat radiation member 50b are disposed on the base portion 30b but not thermally crimped. The thermal crimping of the present embodiment will be described with reference to FIGS. 5 and 6. FIG. 5 is a cross-sectional view showing a state of thermal crimping of the heat radiation member fixing rib 33. In FIG. 5, the state of the heat radiation member fixing rib 33 before thermal crimping is indicated by a dashed line. Thermal crimping softens a tip portion 33t of the heat radiation member fixing rib 33 protruding from the heat radiation member fixing hole 53 by heating the tip portion 33t to form a flange portion 33f having a diameter larger than the diameter of the heat radiation member fixing hole 53 such that the heat radiation member fixing rib 33 is prevented from coming out of the heat radiation member fixing hole 53 by the flange portion 33f. In the present embodiment, a small gap is formed between the inner peripheral surface of the heat radiation member fixing hole 53 and the outer peripheral surface of the heat radiation member fixing rib 33 in the state where the heat radiation member fixing rib 33 is thermally crimped. The time and temperature for heating are appropriately set during the thermal crimping process to obtain the above state. "Thermal crimping" is one form of "crimping", and the expression "is thermally crimped" may indicate the process of thermal crimping or the state after thermal crimping is performed.

Accordingly, the heat radiation member fixing ribs 33 is inserted through the heat radiation member fixing holes 53 and thermally crimped, so that the heat radiation member 50b is fixed to the base portion 30b. A small gap is formed between the inner peripheral surfaces of the heat radiation member fixing holes 53 and the outer peripheral surfaces of the heat radiation member fixing ribs 33. Therefore, the heat radiation member 50b is fixed to the base portion 30b in a state where the heat radiation member 50b is restricted from moving in the direction perpendicular to the upper surface of the base portion 30b and is slightly movable in the direction along the upper surface of the base portion 30b.

Figure 6:
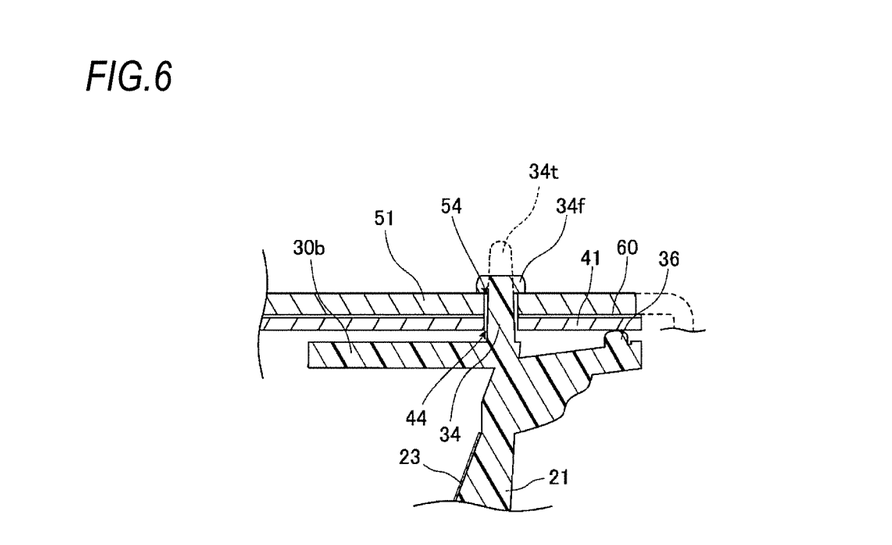
FIG. 6 is a cross-sectional view showing a state of thermal crimping of a light-source unit fixing rib.

FIG. 6 is a cross-sectional view a state of thermal crimping of the light-source unit fixing rib 34. As shown in FIG. 6, the light-source unit fixing ribs 34 of the light-source unit 40b are inserted through the light-source unit fixing holes 44 of the substrate 41 and the light-source unit fixing rib insertion holes 54 of the heat radiation member 50b, and then thermally crimped, so that the light-source unit 40b is fixed to the base portion 30b. In the present embodiment, the tip portion 34t of the light-source unit fixing rib 34 (shown by a dashed line) protruding from the light-source unit fixing rib insertion hole 54 (to the side opposite to the substrate 41) is softened by heating to form a flange portion 34f having a diameter larger than the diameter of the light-source unit fixing rib insertion hole 54. The flange portion 34f prevents the light-source unit fixing rib 34 from coming out of the light-source unit fixing rib insertion hole 54. Thus, as a result of the heat radiation member 50b being fixed, the light-source unit 40b is fixed. That is, the light-source unit 40b is fixed by thermal crimping of the light-source unit fixing ribs 34 via the heat radiation member 50b. As described above, the diameter of the light-source unit fixing hole 44 is larger than the diameter of the light-source unit fixing rib 34, and the light-source unit fixing rib 34 is thermally crimped such that a small gap is formed between the outer peripheral surface of the light-source unit fixing rib 34 and the inner peripheral surface of the light-source unit fixing hole 44. Therefore, similar to the heat radiation member 50b, the light-source unit 40b is fixed to the base portion 30b in a state where the light-source unit 40b is restricted from moving in the direction perpendicular to the upper surface of the base portion 30b and is slightly movable in the direction along the upper surface of the base portion 30b. Further, the diameter of the light-source unit fixing rib insertion hole 54 is larger than the diameter of the light-source unit fixing rib 34, and the light-source unit fixing rib 34 is thermally crimped such that a small gap is formed between the outer peripheral surface of the light-source unit fixing rib 34 and the inner peripheral surface of the light-source unit fixing rib 34. Thus, the restriction of the slight movement of the heat radiation member 50b by the light-source unit fixing ribs 34 in the direction along the upper surface of the base portion 30b is suppressed.

Unlike the present embodiment, without forming the light-source unit fixing rib insertion holes 54 in the heat radiation member 50b, the light-source unit fixing ribs 34 may be inserted through the light-source unit fixing holes 44 and thermally crimped to fix the light-source unit 40b before positioning the heat radiation member 50b. In this case, the flange portion of the light-source unit fixing rib 34 is positioned between the light-source unit 40b and the heat radiation member 50b.

Next, the operations and effects of the vehicle headlamp 1 of the present embodiment will be described.

As described above, the vehicle headlamp 1 according to the present embodiment includes: the reflector unit RU having the plurality of reflectors 20a, 20b, 20c connected to each other and the base portions 30a, 30b, 30c to which the respective reflectors are connected respectively; the plurality of light-source units 40a, 40b, 40c disposed on the respective base portions for the reflectors; and the plurality of heat radiation members 50a, 50b, 50c disposed on the respective light-source units. The base portions 30a, 30b, 30c are provided with the plurality of heat radiation member fixing ribs 33 extending to the side opposite to reflectors, and the heat radiation members 50a, 50b, 50c are formed with a plurality of heat radiation member fixing holes 53 having a diameter larger than that of the heat radiation member fixing ribs 33. Then, each of the heat radiation member fixing ribs 33 is inserted through the respective one of the heat radiation member fixing holes 53 and thermally crimped such that a gap is formed between the inner peripheral surface of the heat radiation member fixing hole 53 and the outer peripheral surface of the heat radiation member fixing rib 33.

Figure 7A:
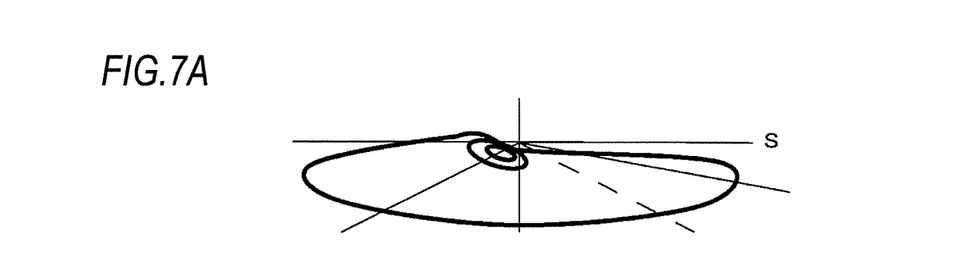
FIGS. 7A to 7C are diagrams showing light distribution.
Figure 7B:
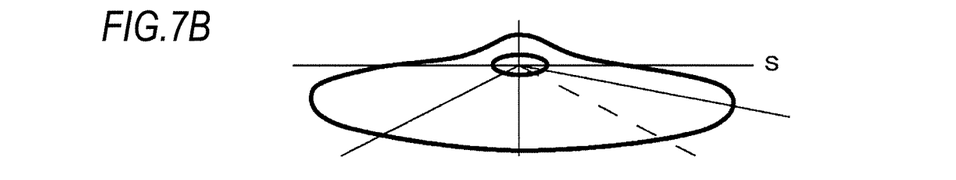
Figure 7C:
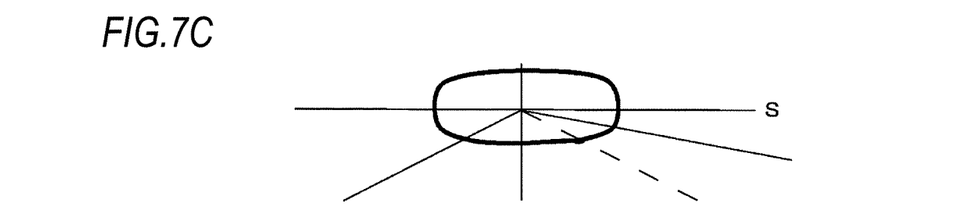

In the vehicle headlamp 1, when light is emitted from the light-source units 40a, 40b, 40c, the light is reflected by the reflective surfaces 23r of the reflectors 20a, 20b, 20c, passes through the front cover 12 and is irradiated with a desired light distribution. FIGS. 7A to 7C are diagrams showing light distribution. For example, if some or all of the lamps 1a to 1c are low-beam lamps and low-beam irradiation is performed, the light distribution shown in FIG. 7A is formed. Further, for example, in the case where some of the lamps 1a to 1c are low-beam lamps and the others are high-beam lamps and high-beam irradiation is performed in addition to low-beam irradiation, the light distribution shown in FIG. 7B is formed. Further, if some of the lamps 1a to 1c are daylight-illumination lamps and light for daytime illumination is irradiated, the light distribution shown in FIG. 7C is formed.

At this time, the light-source units 40a, 40b, 40c tend to generate heat. The heat is transferred to the heat radiation members 50a, 50b, 50c arranged on the light-source units 40a, 40b, 40c and is radiated from the heat radiation members 50a, 50b, 50c. However, due to heat from the light-source units 40a, 40b, 40c, heat generated from the lighting circuits for lighting the light-source units 40a, 40b, 40c, heat transferred from an engine, or the like, the ambient temperature in the lamp room LR might rise. Heat in the lamp room LR is transferred to the reflector unit RU, and the reflector unit RU tends to thermally expand.

Even in the case where the distance between the reflectors increases due to the thermal expansion of the reflector unit RU, in the vehicle headlamp 1 of the present embodiment, since the plurality of light-source units 40a, 40b, 40c are disposed on the respective reflectors 20a, 20b, 20c, it is possible to suppress changes of the relative positions between the reflectors 20a, 20b, 20c and the light-source units 40a, 40b, 40c disposed on the reflectors 20a, 20b, 20c. Further, since the plurality of heat radiation members 50a, 50b, 50c are disposed respectively on the reflectors 20a, 20b, 20c, even when the distance between the reflectors is increased, the heat radiation members 50a, 50b, 50c can move and follow the reflectors 20a, 20b, 20c. If each of the heat radiation members 50a, 50b, 50c were integrated, stress applied on the reflector unit RU would be a concern since heat radiation members are generally more rigid than reflector unit. However, as in the vehicle headlamp 1 of the present embodiment, since the plurality of heat radiation members 50a, 50b, 50c are disposed respectively on the reflectors 20a, 20b, 20c, even in the case where the reflector unit RU thermally expands, stress applied to the reflector unit RU can be suppressed.

In the vehicle headlamp 1 according to the present embodiment, the heat radiation member fixing ribs 33 inserted through the heat radiation member fixing holes 53 of the heat radiation members 50a, 50b, 50c are thermally crimped such that the heat radiation members 50a, 50b, 50c are fixed. The heat radiation member fixing ribs 33 are smaller in diameter than the heat radiation member fixing holes 53, so that a gap is formed between the inner peripheral surface of the heat radiation member fixing hole 53 and the outer peripheral surface of the heat radiation member fixing rib 33. Therefore, in a state of being thermally crimped, while movement of the heat radiation members 50a, 50b, 50c in the extending direction of the heat radiation member fixing ribs 33 is restricted, there is room for movement in a direction perpendicular to the extending direction. Therefore, even when the reflector unit RU and the heat radiation members 50a, 50b, 50c expand with different thermal expansion coefficients, since the heat radiation member fixing ribs 33 that fix the heat radiation members 50a, 50b, 50c are movable in the heat radiation member fixing holes 53, stress on the reflectors 20a, 20b, 20c can be suppressed.

Accordingly, the vehicle headlamp 1 of the present embodiment has excellent thermal durability.

In the vehicle headlamp 1 of the present embodiment, the thermal conductivity of the heat radiation members 50a, 50b, 50c is larger than the thermal conductivity of the reflector unit RU.

As described above, thermal crimping is performed by deforming a portion of the heat radiation member fixing rib 33 protruding from the heat radiation member fixing hole 53 using heat. Therefore, since the thermal conductivity of the heat radiation members 50a, 50b, 50c is larger than the thermal conductivity of the reflector unit RU, the heat during the thermal crimping is transferred mainly to the heat radiation members 50a, 50b, 50c and irradiated. Therefore, according to the vehicle headlamp 1 of the present embodiment, deformation of the reflector unit RU at fixing the heat radiation members 50a, 50b, 50c to the reflector unit RU by thermal crimping can be suppressed.

In the vehicle headlamp 1 according to the present embodiment, the plurality of light-source unit fixing ribs 34 extending to the side opposite to the reflector are provided on the base portions 30a, 30b, 30c, and the plurality of light-source unit fixing holes 44 having a larger diameter than the light-source unit fixing ribs 34 are provided to each of the light-source units 40a, 40b, 40c. Each light-source unit fixing ribs 34 is inserted through the respective light-source unit fixing hole 44 and thermally crimped such that a gap is formed between the inner peripheral surface of the light-source unit fixing hole 44 and the outer peripheral surface of the light-source unit fixing rib 34.

When the temperatures of the reflector unit RU and the light-source units 40a, 40b, 40c rise as described above, the reflector unit RU and the light-source units 40a, 40b, 40c tend to expand at mutually different expansion rates. The light-source unit fixing rib 34 is inserted into the light-source unit fixing hole 44 which has a diameter larger than that of the light-source unit fixing rib 34. Then, the light-source unit fixing rib 34 is thermally crimped such that a gap is formed between the inner peripheral surface of the light-source unit fixing hole 44 and the outer peripheral surface of the light-source unit fixing rib 34, so that the light-source units

40a, 40b, 40c are fixed to the reflector unit RU. Therefore, in a state of being thermally crimped, while movement of the light-source units 40a, 40b, 40c in the extending direction of the light-source unit fixing ribs 34 is restricted, there is room for movement in a direction perpendicular to the extending direction. Therefore, even when the reflector unit RU and the light-source units 40a, 40b, 40c expand with different thermal expansion coefficients as described above, since the light-source unit fixing ribs 34 are movable within the light-source unit fixing hole 44, stress on the reflectors 20a, 20b, 20c can be suppressed.

It is preferable that the size of the gap between the inner peripheral surface of the light-source unit fixing hole 44 and the outer peripheral surface of the light-source unit fixing rib 34 be smaller than the size of the gap between the inner peripheral surface of the heat radiation member fixing hole 53 and the outer peripheral surface of the heat radiation member fixing rib 33. In this case, when the reflector unit RU thermally expands, the heat radiation member fixing ribs 33 moves in the heat radiation member fixing holes 53 such that stress on the reflectors 20a, 20b, 20c can be suppressed, and relative displacement between the light-source units 40a, 40b, 40c and the reflectors 20a, 20b, 20c can be suppressed.

Unlike the present embodiment, the diameter of the light-source unit fixing hole 44 and the diameter of the light-source unit fixing rib 34 may be equal to each other without forming a gap between the inner peripheral surface of the light-source unit fixing hole 44 and the outer peripheral surface of the light-source unit fixing rib 34. In this case, when the reflector unit RU expands and the position of the light-source unit fixing hole 44 moves slightly, the light-source unit fixing rib 34 follows the movement of the light-source unit fixing hole 44 more accurately. In this case, a change in light distribution due to relative displacements in position between the light-source units 40a, 40b, 40c and the reflectors 20a, 20b, 20c can be further suppressed.

Second Embodiment

Next, a second embodiment of the present invention will be described in detail with reference to FIG. 8. The same or equivalent constituent elements as those of the first embodiment will be denoted with the same reference numerals and duplicate explanations will be omitted except when specifically described.

Figure 8:
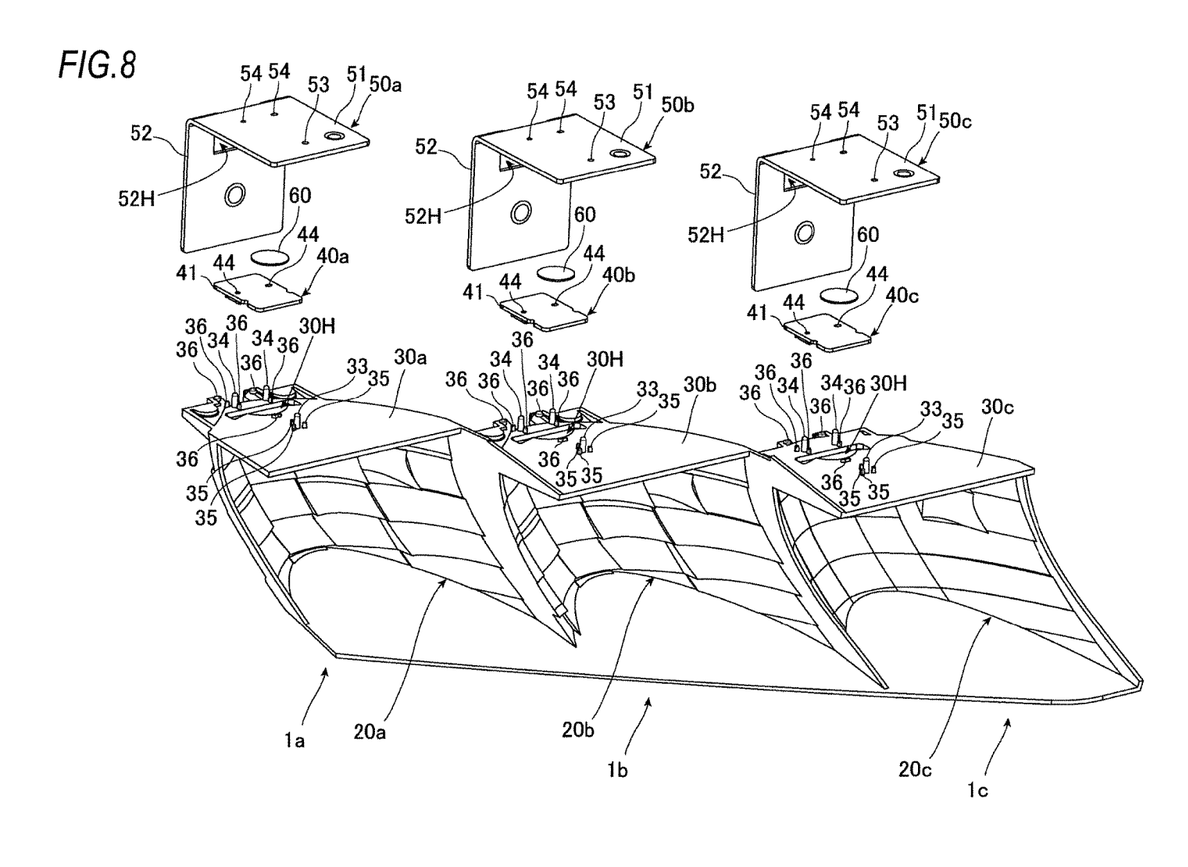
FIG. 8 is a view showing a lamp unit of a vehicle headlamp according to a second embodiment of the present invention, similar to FIG. 3.

FIG. 8 is a view showing a lamp unit of a vehicle headlamp according to the second embodiment of the present invention in the same manner as in FIG. 3. The lamp unit LU of the present embodiment is different from the lamp unit of the first embodiment in that it does not include the heat radiation member fixing ribs 33 of the first embodiment. However, as in the first embodiment, the light-source unit fixing ribs 34 are inserted through the light-source unit fixing holes 44 of the light-source unit 40b and the light-source unit fixing rib insertion holes 54 of the heat radiation member 50b and then thermally crimped. Therefore, the heat radiation member 50b is fixed by the light-source unit fixing ribs 34. In this embodiment, light-source unit positioning protruding portions 36 are also provided around the light-source unit fixing ribs 34.

Since the heat radiation member 50b is fixed by the light-source unit fixing ribs 34 in this manner, the light-source unit fixing ribs 34 of the present embodiment can be also regarded as heat radiation member fixing ribs, and in this case, the light-source unit fixing rib insertion holes 54 of the heat radiation member 50b can be also regarded as heat radiation member fixing holes. Then, in each of the light-source units 40a, 40b, 40c, a plurality of light-source unit fixing holes 44 having a larger diameter than the heat radiation member fixing ribs are formed at positions which overlap the heat radiation member fixing holes. Then, the heat radiation member fixing ribs are inserted through the light-source unit fixing holes 44. Accordingly, the light-source units 40a, 40b, 40c are fixed by the heat radiation member fixing ribs; that is, by fixing the light-source units 40a, 40b, 40c and the heat radiation members 50a, 50b, 50c by thermal crimping of the heat radiation member fixing ribs, the number of ribs can be reduced and a simple configuration can be obtained.

Although the present invention has been described with reference to the first and second embodiments by way of example, the present invention is not limited to these.

For example, in the above embodiment, the number of lamps is not particularly limited as long as it is plural.

Further, the base portions 30a, 30b, 30c may not be connected to each other, and may not have steps.

The number of the heat radiation member fixing ribs 33 and the number of the light-source unit fixing ribs 34 are not particularly limited as long as they are plural.

Further, in the above embodiments, a parabolic-type lamp is described as an example, but the lamp is not limited to such parabolic-type lamp.

According to the present invention, a vehicle headlamp with excellent heat durability can be provided, and it can be used in the field of vehicle headlights for automobiles or the like.

What is claimed is:

1. A vehicle headlamp comprising:
    a reflector unit including a plurality of reflectors connected to each other, and base portions to which the reflectors are connected respectively;
    a plurality of light-source units disposed on the base portions for the respective reflectors; and
    a plurality of heat radiation members disposed on the respective light-source units,
    wherein the base portions are provided with a plurality of heat radiation member fixing ribs extending to a side opposite to the reflectors,
    wherein the heat radiation members are formed with a plurality of heat radiation member fixing holes having a diameter larger than that of the heat radiation member fixing ribs, and
    wherein each of the heat radiation member fixing ribs is inserted through the respective one of the heat radiation member fixing holes and thermally crimped such that a gap is formed between an inner peripheral surface of the heat radiation member fixing hole and an outer peripheral surface of the heat radiation member fixing rib.

2. The vehicle headlamp according to claim 1,
    wherein a thermal conductivity of the heat radiation members is larger than a thermal conductivity of the reflector unit.

3. The vehicle headlamp according to claim 1,
    wherein the base portions are provided with a plurality of light-source unit fixing ribs extending to the side opposite to the reflectors, and
    wherein the light-source units are formed with a plurality of light-source unit fixing holes having a diameter larger than a diameter of the light-source unit fixing ribs, and
    wherein each of the light-source unit fixing ribs is inserted through the respective one of the light-source unit fixing holes and thermally crimped such that a gap is formed between an inner peripheral surface of the light-source unit fixing hole and an outer peripheral surface of the light-source unit fixing rib.

4. The vehicle headlamp according to claim 3, wherein each of the light-source units includes a light-emitting element and a substrate on which the light-emitting element is mounted, and the light-source unit fixing holes are formed in the substrate.

5. The vehicle headlamp according to claim 1, wherein the light-source units are formed with a plurality of light-source unit fixing holes having a diameter larger than that of the heat radiation member fixing ribs at positions which overlap with the heat radiation member fixing holes, and
wherein the heat radiation member fixing ribs are inserted through the light-source unit fixing holes.

* * * * *